United States Patent [19]

Baumann et al.

[11] Patent Number: 5,026,262
[45] Date of Patent: Jun. 25, 1991

[54] MULTIPIECE ECCENTRIC SHAFT

[75] Inventors: David C. Baumann; Howard H. Fraser, Jr., both of Lafayette, N.Y.

[73] Assignee: Carrier Corporation, Syracuse, N.Y.

[21] Appl. No.: 444,944

[22] Filed: Nov. 28, 1989

[51] Int. Cl.$^5$ .............. F04C 18/04; F04C 29/00; F01M 11/02; F16C 3/14
[52] U.S. Cl. .................... 418/55.6; 418/94; 418/151; 184/6.18; 464/181
[58] Field of Search ............ 418/55.1, 55.6, 94, 418/151; 464/181, 183; 417/410; 184/6.18

[56] References Cited

U.S. PATENT DOCUMENTS 4,488,855 12/1984 Butterworth .................. 418/94
4,704,918 11/1987 Orkin et al. .................. 464/181
4,762,478 8/1988 Sakurai et al. ................ 418/151

FOREIGN PATENT DOCUMENTS 0054937 6/1982 European Pat. Off. ........ 464/181
55-72685 5/1980 Japan ........................ 418/94

Primary Examiner—John J. Vrablik

[57] ABSTRACT

A crankshaft having a main bearing portion, formed by metal forging, casting or powdered metallurgy, and having coupled thereto a rotor stub portion comprising a steel tube fixedly secured to the main bearing portion, such as by press fitting, friction or laser welding. The rotor stub portion of the crankshaft is formed with suitable oil hole passages to deliver oil through the rotor stub portion to any desired location along this portion of the crankshaft.

7 Claims, 2 Drawing Sheets

MULTIPIECE ECCENTRIC SHAFT

BACKGROUND OF THE INVENTION

This invention relates in general to crankshafts and, in particular, to an improved construction for a crankshaft which reduces manufacturing costs and provides greater latitude in manufacturing techniques.

This invention is especially suitable for use in a scroll type compressor wherein a pair of mating scrolls, each of which has an involute spiral wrap of similar shape mounted on respective base plates, undergo mutual rotation so that the scrolls orbit one another. In such compressors one scroll is held fixed and the other is orbited to revolve, but not rotate, by means of an Oldham ring or other anti-rotating structure. A compressible fluid, such as a refrigerant gas, is introduced at the side of the spiral wraps and is compressed as the gas moves under the orbiting motion of the device. The compressed gas is then discharged at the center. By reversing the process, introducing compressed fluid at the center and permitting the fluid expansion to drive the device, a scroll machine can be used as a motor.

Because the orbiting motion of the moving scroll is unbalanced and off axis, a vibrating moment is created which must be appropriately balanced by a suitable counterweight. Current designs for scroll-type compressors, or other scroll-type rotating machines, require that the counterweight be positioned a considerable axial distance away from the orbiting scroll that the counterweight is intended to counterbalance. Such counterweights are carried by the rotor crankshaft, but fabricating a crankshaft which includes a rotor-mounted counterweight by known manufacturing techniques is very expensive. Such existing fabrication processes include machining a single cast piece of iron, gray or ductile, or machining the crankshaft from a forging. Regardless of which of these basic fabrication processes are utilized, the crankshaft must be machined from a single, substantially homogeneous, piece of material thereby requiring substantial manufacturing costs.

SUMMARY OF THE INVENTION

It is, therefore, an object of this invention to improve the fabrication of crankshafts.

A further object of this invention is to improve the fabrication of crankshafts having a counterweight as a part of the crankshaft.

Still another object of this invention is to improve the manufacturability of a crankshaft for use in a scroll compressor or motor wherein a counterweight is an integral part of the crankshaft or is secured to the crankshaft.

These and other objects are attained in accordance with the present invention wherein there is provided a crankshaft having a main bearing portion, formed by metal forging, casting or powdered metallurgy, and having coupled thereto a rotor stub portion comprising a steel tube fixedly secured to the main bearing portion, such as by press fitting, friction or laser welding. The rotor stub portion of the crankshaft is formed with suitable oil hole passages to deliver oil through the rotor stub portion to any desired location along this portion of the crankshaft.

DESCRIPTION OF THE DRAWINGS

Further objects of the invention together with additional features contributing thereto and advantages accruing therefrom will be apparent from the following description of a preferred embodiment of the invention which is shown in the accompanying drawings with like reference numerals indicating corresponding parts throughout, wherein.

DESCRIPTION OF A PREFERRED EMBODIMENT

Figure 1:
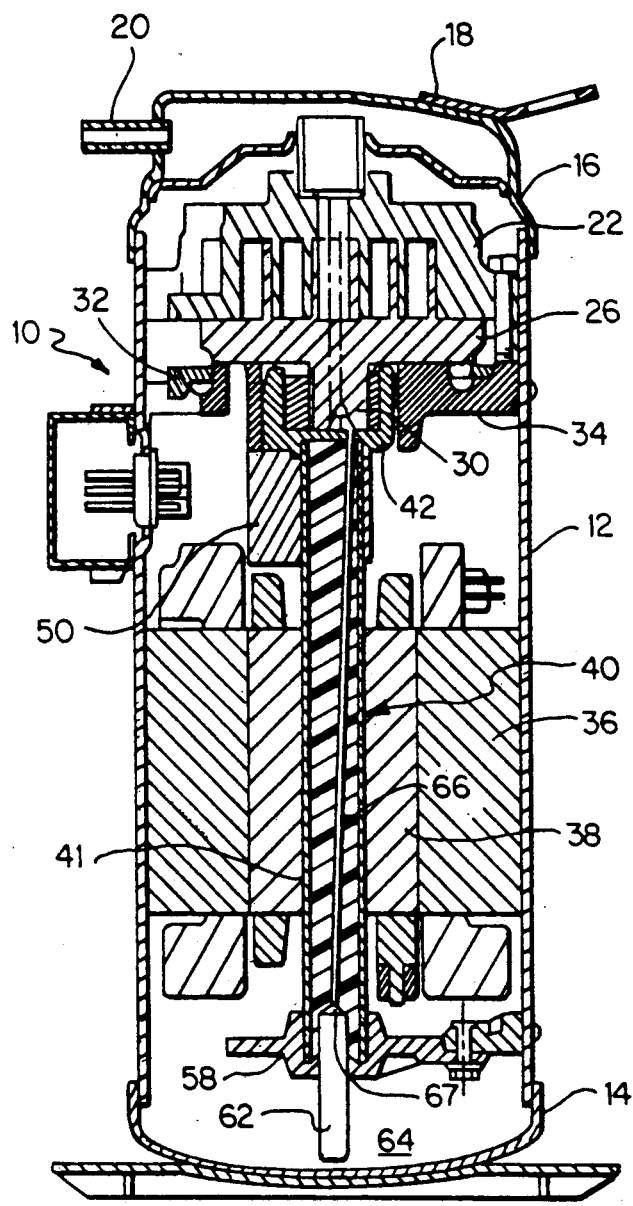
FIG. 1 is a cross sectional view of a scroll-type compressor to illustrate the invention incorporated therein.
Figure 2:
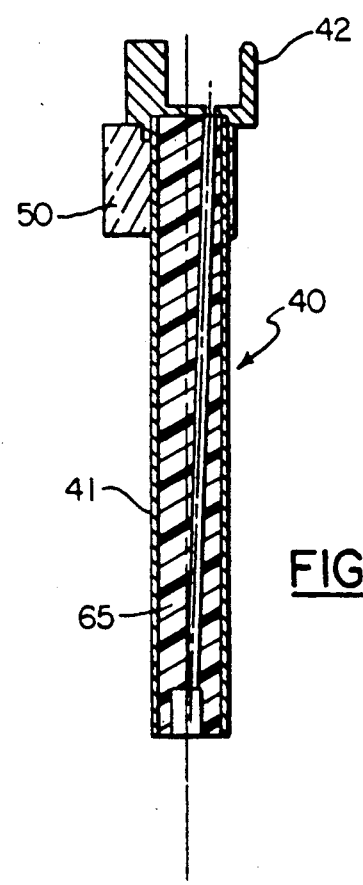
FIG. 2 is a cross sectional view of the invention to better illustrate the structural relationships between the main bearing portion and the stub rotor portion of the crankshaft, and a counterbalancing eccentric connected thereto.
Figure 3:
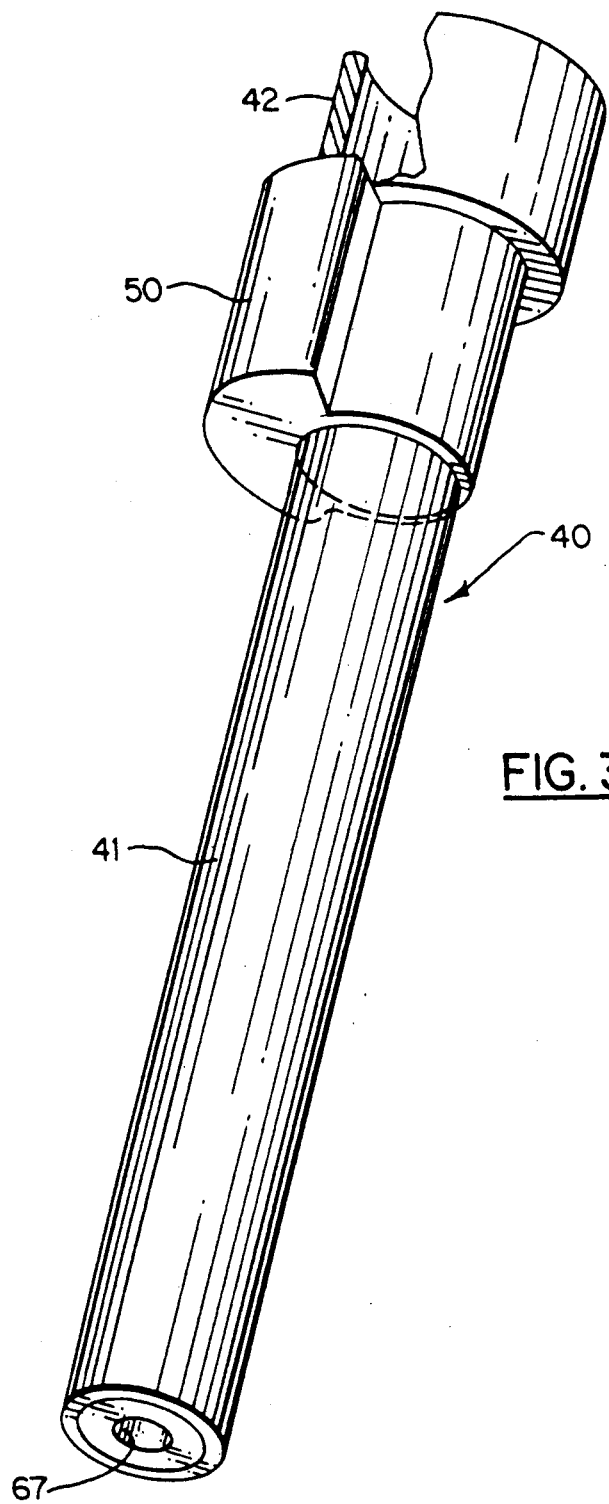
FIG. 3 is a perspective view of the invention to better illustrate the components and construction thereof.

While the invention is believed to have a number of applications, for convenience of illustration in describing the best mode presently contemplated for carrying out this invention, the crankshaft is described with reference to its use in a scroll-type compressor 10 such as shown in FIG. 1. As is known to those skilled in the art, the scroll compressor 10 generally has a fixed scroll 22 mounted in a housing 12, and an orbiting scroll 26 which is fixed against rotation, but which is permitted to revolve in an orbiting motion about the axis of the fixed scroll 22. The housing 12 is closed at its upper end with an upper cap 16 and at its lower end with a lower cap 14. A pressure dome 18 holds gas that is compressed in the compressor and conducts it to a high pressure outlet 20 after exiting from the center of the fixed scroll which is rigidly mounted within the housing 12. A male stub 30 depends from the orbiting scroll 26 at the center or axis thereof to be engaged by a portion of a drive shaft or crankshaft 40 to be hereinafter described in detail. The orbiting scroll 26 is fixed against rotation by means of an anti-rotation device, such as an Oldham's ring 32 which prevents rotation of the orbiting scroll 26, but permits the orbiting scroll 26 to revolve without rotation around the center or axis of the fixed scroll 22.

An electric motor drive for the compressor is carried within the compressor housing 12 and includes a stator armature 36 having a cylindrical passage formed therethrough to receive a rotor assembly 38 rotatably journaled within the compressor housing 12. The rotor 38 is positioned within the generally cylindrical passage formed in the stator 36 resulting in a small annular gap therebetween. Relative motion between the fixed scroll 22 and the orbiting scroll 26 is provided through a drive shaft 40 which has the electrical rotor 38 press fit thereonto. The drive shaft 40 has a generally cylindrically shaped upper-bearing cap 42 formed on an upper end of the drive shaft 40 and adapted to receive the stem portion 30 of the orbiting scroll 26. In this manner rotational motion of the rotor 38 within the stator 36 will effect an orbiting motion of the orbiting scroll 26 relative to the fixed scroll 22. The bearing cap 42 is journaled within an upper-bearing 34.

Because the orbiting motion of the moving scroll 26 is unbalanced, a counterweight 50 is positioned on the drive shaft 40 immediately adjacent the bearing cap 42. Preferably, the counterweight 50 is arcuate in form, in the shape of a segment of a cylinder subtending an arc of approximately 160°, and disposed to the side opposite the radial position of the offset of the orbiting scroll 26. The counterweight 50 may be formed as an integral part of the drive shaft 40 or as a separate piece which is secured thereto. Preferably, the counterweight 50 lies at or within the radius of the cylindrical passage in the stator 36 to permit the crank and rotor assembly to be installed from below after the stator 36 has been affixed into the housing 12.

The drive shaft 40 is formed of a two-piece construction with the bearing cap 42 being preferably formed as a single or separate metal forging, casting or powdered metal piece. The shaft portion or rotor stub 41 is preferably formed as a steel tube which is either press fitted, friction or laser welded to the bearing cap 42. In this manner, the main bearing portion, the bearing cap 42, can be fabricated from preferably a near net shape powdered metal process which will greatly reduce the machining time normally associated with constructing this portion of the drive shaft. The rotor stub portion of the drive shaft, tube 41, made from a steel tube will require no machining and can be readily attached to the main bearing portion 42 by the above processes. In this manner, the two-piece formation of the drive shaft eliminates time consuming and expensive machining processes heretofore required.

The lower end of the drive shaft 40 is supported in a lower bearing 58 which journals the lower end of the drive shaft in a position in fluid communication with an oil sump or reservoir 64 which provides a source of lubricating oil for the various bearing surfaces. An oil pick-up tube 62 extends from an opening in the lower end of the drive shaft 40 and is immersed in the sump 64. An oil distribution bore 66 extends from a chamber 67 formed in the lower end of the drive shaft, and into which the oil pick-up tube 62 is secured, over the length of the drive shaft and into an oil receiving chamber formed in the bearing cap 42. The oil distribution bore 66 slants at an angle to the axis of rotation so as to be situated on the side opposite to the position of the counterweight 50. A number of oil distribution channels and ports (not shown) connect with the oil distribution bore 66 to provide lubricant to the upper and lower bearings, as well as any other lube location where lubrication may be required, through centrifugal action upon rotation of the rotor and shaft. Because the rotor stub portion 41 of the drive shaft 40 is formed from a steel tube, a cylindrical plastic extrusion or molded piece 65 may be utilized to form the oil pick-up bore 66 and oil distribution channels and ports in order to define the desired oil passageways. This process eliminates the need to bore and drill the drive shaft as previously necessary.

While the invention has been described in the specification and illustrated in the drawings with reference to a preferred embodiment, it will be understood by those skilled in the art that various changes may be made and equivalents may be substituted for elements of the invention without departing from the scope of the claims. In addition, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiment falling within the description of the appended claims.

What is claimed is:

1. A multipiece drive shaft adapted for use in driving an object in an orbital path of movement about a central axis comprising:

a bearing cap for receiving a portion of an object to be driven in an orbital path of movement about a central axis, a tubular rotor shaft having a central axis and affixed to said bearing cap for effecting rotary movement thereto about said central axis, counterbalancing means carried by said tubular rotor shaft for balancing the forces applied by the object being driven in an orbital path of movement about said central axis upon the rotary movement of said tubular rotor shaft said counterbalancing means being secured about said tubular rotor shaft adjacent said bearing cap and;

a plastic cylindrical oil bore member disposed in said tubular rotor shaft, said oil bore member having therein oil distribution channel means extending at an angle to the axis of rotation thereby and to provide an easily manufactured economical drive shaft.

2. In a scroll compressor including a housing having a fixed scroll and an orbiting scroll disposed off the central axis of the fixed scroll for revolving in an orbiting motion thereabouts, an electric motor stator mounted within said housing and having an electric motor rotor assembly for driving said orbiting scroll in the orbiting motion about said fixed scroll, said rotor assembly including a drive shaft having an upper bearing cap and an elongated rotor shaft, said upper bearing cap receiving a portion of said orbiting scroll for imparting the orbiting motion thereto, and a counterweight carried by said rotor shaft to balance the off-axis orbiting motion of said orbiting scroll, the improvement comprising a multipiece drive shaft comprising in combination a bearing cup for receiving a portion of an orbiting scroll for imparting a driving force thereto, a separate tubular rotor shaft affixed to said bearing cap for effecting rotary movement of said bearing cap, a separate plastic oil bore member disposed in said tubular rotor shaft, said oil bore member having therein oil distribution channel means extending at an angle to the axis of rotation from top to bottom thereof, said counterweight being secured about said shaft immediately adjacent said bearing cap and having a maximum radius less than the inner radius of the electric motor stator, whereby said multipiece drive shaft can be inserted through said electric motor stator from the bottom thereof to facilitate assembly and to provide an easily manufactured economical drive shaft.

3. The apparatus of claim 2 wherein said bearing cap comprises a metal forging.

4. Apparatus of claim 2 wherein said bearing cap comprises a casting.

5. The apparatus of claim 2 wherein said bearing cap comprises a powdered metal element.

6. The apparatus of claim 2 wherein said tubular rotor shaft comprises a steel tube.

7. The apparatus of claim 6 wherein said steel tube is fixedly secured to said bearing cap by a press fit, friction or laser welding.

* * * * *